United States Patent [19]

Kadlicko

[11] Patent Number: 5,594,405
[45] Date of Patent: Jan. 14, 1997

[54] PRESSURE TRANSDUCER WITH PRESSURE SENSITIVE CONDUCTOR

[75] Inventor: George Kadlicko, Mississauga, Canada

[73] Assignee: Microhydraulics, Inc., Canada

[21] Appl. No.: 296,724

[22] Filed: Aug. 26, 1994

[51] Int. Cl.⁶ ........................................ G01L 1/22
[52] U.S. Cl. ................ 338/4; 338/2; 338/3; 338/5; 338/36
[58] Field of Search ............ 338/2–5, 13, 36–37; 411/14

[56] References Cited

U.S. PATENT DOCUMENTS

| | | | |
|---|---|---|---|
| 2,467,752 | 4/1949 | Howe | 338/4 |
| 2,474,146 | 6/1949 | Hathaway | 338/3 |
| 2,663,781 | 12/1953 | Rundell | 338/37 |
| 2,729,730 | 1/1956 | Brady | 338/3 |
| 2,883,503 | 4/1959 | Osgood | 338/4 |
| 3,358,257 | 12/1967 | Painter et al. | 338/2 |
| 5,118,237 | 6/1992 | Wright | 411/14 |
| 5,285,707 | 2/1994 | Palm | 411/14 |

*Primary Examiner*—Teresa J. Walberg
*Assistant Examiner*—Karl Easthom
*Attorney, Agent, or Firm*—Ladas & Parry

[57] ABSTRACT

A pressure transducer has a cylindrical body with a thread formed on at least part of the outer surface. A resistance element is wound in the thread and an internal bore receives pressurized fluid. The resistance element is strained by application of pressure to vary its resistance.

8 Claims, 1 Drawing Sheet

PRESSURE TRANSDUCER WITH PRESSURE SENSITIVE CONDUCTOR

The present invention relates to a pressure transducer.

Pressure transducers are used to monitor fluid pressure within a system and frequently need to be located in relatively confined spaces. Many pressure transducers have been proposed, including transducers that utilize strain gauges to monitor variations in pressure. In, for example, U.S. Pat. No. 2,474,146 to Hathaway, there is disclosed a pressure transducer having a cylindrical body with an internal bore to communicate with pressure fluid. A pair of strain responsive resistive elements are wound about the cylindrical body so that variations of the pressure within the bore causes the change in the electrical resistance of one of the elements. These changes are monitored across a bridge to give an indication of changes in the sensed pressure.

Although the transducer shown in Hathaway provides an effective pressure transducer, the arrangement of the resistant elements does require the transducer to project externally from the equipment on which it is used. Moreover, as noted in U.S. Pat. No. 2,837,620 to MacDonald, the helical winding of the resistance wire about a column has not been sufficiently accurate or dependable in operation. The problem appears to have arisen from the difficulty of bonding the strain element to the body and of proper insulation of the element from the body. Moreover, the engagement of the wire with the body along a line of contact can lead to a permanent deformation of the wire as the transducer is pressurized, leading to unpredictable results.

To overcome these difficulties, MacDonald proposes to utilize an oval cross-section for the wires but this still does not overcome the problems of location of the filaments on the cylindrical body.

U.S. Pat. No. 2,920,880 to Laycock also discloses helically wound elements and in this case locates the elements within a wax coating. Again, however, the support and bonding of the element is dependent upon the coating and is not considered satisfactory.

A similar arrangement is shown in U.S. Pat. No. 2,998,585 to Bodner in which a strain element is helically wound around a washer inserted over the shank of a bolt. The purpose of the gauge is to indicate the tension in the bolts but again the Bodner patent does not address the problem of locating the strain wire in a uniform manner or insulating the wire from the body.

It is therefore an object of the present invention to provide a pressure transducer in which the above disadvantages are obviated or mitigated.

In general terms, the present invention provides a pressure transducer in which a cylindrical body has a threaded outer surface. A bore extends into the body to receive the fluid under pressure and induce hoop stresses in the body. A resistance element is located between the flanks of the thread to extend helically along the outer surface so that changes of pressure within the bore induce changes of strain in the electrical conductor to vary the electrical resistance.

By utilizing a helical thread, the resistance element is uniformly wound about the body and is located firmly between the flanks of the thread. The support by the flanks also inhibits deformation of the element in use.

By locating the resistance element at the root of the threaded portion, the transducer may be threaded into the wall of a gallery without damage to the resistance element. This allows the transducer to be located within the envelope of the equipment on which it is used.

It is preferred that the bore extends partially along the body and that a pair of resistance elements are wound at different locations on the body. The resistance element overlying the internal bore may then monitor variations in pressure and the resistance element remote from the bore may be used as a reference element to compensate for changes in temperature.

An embodiment of the invention will now be described by way of example only with reference to the accompanying drawings, in which FIG. 1 is a sectional view of a transducer located in a gallery;

Figure 1:
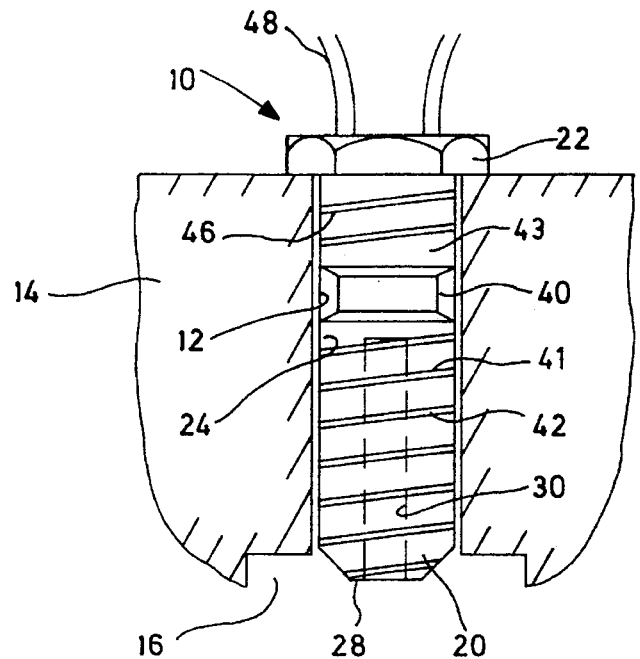

Referring therefore to FIG. 1, a transducer 10 is located in a bore 12 in a wall 14 surrounding a fluid gallery 16. Typically the wall 14 will be formed in, for example, a valve body or similar fitting with the fluid, typically hydraulic fluid, flowing through the gallery 16. It will be apparent that the exact form of the wall and gallery will vary according to application. The bore 12 is threaded, as indicated at 18, to receive the transducer 10.

The transducer 10 includes a cylindrical body 20 extending from a hexagonal head 22. The cylindrical body 20 has a radially outer surface 24 on which is formed a thread 26. The body 20 has an end surface 28 at the opposite end to the head 22 and an internal bore 30 extends from the end surface 28 axially along the body 20. The bore 30 terminates within the body 20 at a predetermined axial location.

Figure 2:
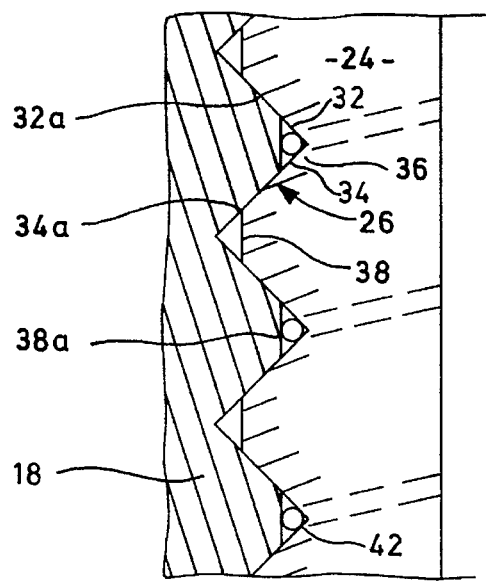
FIG. 2 is an enlarged view of a portion of the transducer shown in FIG. 1.

As can best be seen in FIG. 2, the thread 26 is of conventional form, having a pair of opposed flanks 32,34 that meet at a root 36. The thread 26 is complementary to the thread 18 in bore 12 which thread 18 has corresponding flanks 32a, 34a.

The tip of each of the threads 26,18 is relieved as indicated at 38 and 38a to provide a void 39 at the root 36 of the thread 26 when the threads 26,18 are engaged. A circumferential recess 40 is also formed in the body 20 between the internal bore 28 and the head 22 to subdivide the body into upper and lower sections 41,43.

Figure 3:
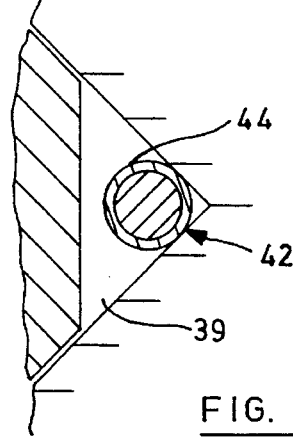
FIG. 3 is an enlarged detail view of the portion of the transducer shown in FIG. 2.

An electrical resistance element 42 is located in the thread 26 adjacent the root 36. The resistance element 42 is wound helically about the outer surface 24 of the lower section 41 of the body 20 from the surface 28 to the recess 40. As can best be seen in FIG. 3, the resistance element 42 is snugly received between the flanks 32,34 and spaced from the tip 38a. The resistance element 42 has its outer surface 44 anodized so as to be non-conductive and thereby provide an insulation between the body 20 and the conductor 42 without altering the mechanical characteristics of the conductor 42.

The resistance element 42 terminates at the recess 40 with opposite ends fed through the body 20 to the head 22. A second resistance element 46 is similarly located in the thread 26 in the upper section 43 between the recess 40 and head 22 and likewise has leads 48 extending through the head for connection in the electrical circuit.

In operation, the transducer 10 can readily be inserted into the wall 14 by virtue of the clearance provided between the tip of the thread 18 and the root of the thread 26. The resistance element 42 is snugly and securely located in a uniform distribution about the body 20 and upon application of pressure to the gallery 16 will be stressed and its resistance varied. The second element 46 provides a reference value and by connecting the elements 42,46 across a bridge, it is possible to monitor variations in pressure in the gallery 16. The second element 46 provides a reference to compensate for changes in temperature which also affect the resistance of the element 42.

The use of the thread 26 to locate the strain element ensures that the strain element is uniformly distributed to provide consistent results. Similarly, the anodization of the surface ensures an accurate transfer of forces from the internal bore 30 through the body 20 to the strain element. The support of the wire between a pair of flanks 32,34 provides an increased contact surface that reduces localized stress and inhibits permanent deformation of the wire.

We claim:

1. A pressure transducer for insertion in an opening in a wall of a fitting containing a fluid under pressure, the pressure transducer comprising a cylindrical body with an internal bore extending axially from one end of said body, a radially outwardly directed outer surface and a thread formed on said outer surface and extending helically along at least part of said outer surface for insertion within the opening in the wall of said fitting to expose said bore to the pressure in said fitting, said helical thread having opposed flanks forming a root therebetween, and an electrical conductor helically wound around said body and receivable within the helical thread thereon, said conductor being disposed adjacent the root of said helical thread and in abutment with said opposed flanks thereof, said helical thread and said conductor being receivable within a complementary threaded portion of said opening in the fitting wherein pressure applied to said bore induces a strain in said conductor to vary the electrical resistance thereof.

2. A pressure transducer according to claim 1 wherein an outer surface of said conductor is anodized to insulate electrically said conductor from said body.

3. A pressure transducer according to claim 1 wherein said internal bore terminates within said body and said conductor is located on the radially outer surface within the axial extent of said bore.

4. A pressure transducer according to claim 3 wherein said thread extends axially beyond said bore and a further electrical conductor is located between said flanks of said thread axially beyond said bore.

5. A pressure transducer according to claim 4 wherein a circumferential recess is formed in said outer surface beyond the axial extent of said bore between said conductors.

6. A pressure transducer according to claim 4 wherein each of said conductors has an anodised outer surface to insulate electrically said conductors.

7. A pressure transducer for insertion in an opening in a wall of a fitting containing a fluid under pressure, the pressure transducer comprising a cylindrical body having an outwardly directed surface, a helical thread formed on said outwardly directed surface for insertion within the opening in the wall of said fitting to expose said bore to the pressure in said fitting, said helical thread having opposed flanks forming a root therebetween, and an internal bore extending axially along said body from an end surface and terminating within said body at a predetermined axial location, a first electrical conductor helically wound about said body and receivable within the helical thread thereon, said first conductor located adjacent said root of said thread and in abutment with said opposed flanks thereof and extending between said end surface and said predetermined axial location, and a second conductor helically wound about said body and receivable within the helical thread thereon, said second conductor being located adjacent said root of said helical thread and in abutment with said opposed flanks thereof and extending from adjacent said predetermined axial location and in a direction away from said end surface, said helical thread and said first and second conductors being receivable within a complementary threaded portion of said opening in the fitting whereby pressure applied to said bore induces a strain in said first electrical conductor to vary the electrical resistance thereof.

8. A pressure transducer according to claim 7 wherein each of said conductors has an anodized outer surface to insulate electrically said conductors and said body.

* * * * *